(12) United States Patent
Park et al.

(10) Patent No.: US 11,398,319 B2
(45) Date of Patent: Jul. 26, 2022

(54) SPENT NUCLEAR FUEL TRANSFER CASK HAVING MOTOR-DRIVEN LIDS THAT SLIDE TOWARD AND AWAY FROM EACH OTHER

(71) Applicant: KEPCO ENGINEERING & CONSTRUCTION COMPANY, INC., Gyeongsangbuk-do (KR)

(72) Inventors: Jin Seok Park, Sejong-si (KR); Soung Kyu Lee, Daejeon (KR); Sung Hwan Kim, Sejong-si (KR); Kwang Jeok Ko, Daejeon (KR); Min Gyu Kim, Daejeon (KR); Yeon Ho Cho, Daejeon (KR)

(73) Assignee: KEPCO ENGINEERING & CONSTRUCTION COMPANY, INC., Gimcheon-si (KR)

( * ) Notice: Subject to any disclaimer, the term of this patent is extended or adjusted under 35 U.S.C. 154(b) by 0 days.

(21) Appl. No.: 17/036,132

(22) Filed: Sep. 29, 2020

(65) Prior Publication Data

US 2021/0098145 A1    Apr. 1, 2021

(30) Foreign Application Priority Data

Oct. 1, 2019  (KR) .......................... 10-2019-0121738

(51) Int. Cl.
*G21F 5/008* (2006.01)
*G21C 19/32* (2006.01)

(52) U.S. Cl.
CPC .............. *G21F 5/008* (2013.01); *G21C 19/32* (2013.01)

(58) Field of Classification Search
CPC ... G21F 5/008; G21F 5/14; G21F 7/00; G21C 19/32

USPC ......................................................... 376/272
See application file for complete search history.

(56) References Cited

U.S. PATENT DOCUMENTS

| | | | |
|---|---|---|---|
| 6,625,246 B1 | 9/2003 | Singh et al. | |
| 2014/0070118 A1* | 3/2014 | Agace | G21F 5/12 250/507.1 |

FOREIGN PATENT DOCUMENTS

KR        10-1559300 B1    11/2015

OTHER PUBLICATIONS

Korean Office Action (Application No. 10-2019-0121738) dated Oct. 28, 2020.

* cited by examiner

*Primary Examiner* — Jack W Keith
*Assistant Examiner* — Daniel Wasil
(74) *Attorney, Agent, or Firm* — Nixon Peabody LLP; Jeffrey L. Costellia (57) ABSTRACT

The present disclosure relates to a sliding type transfer cask for transferring spent nuclear fuel. The sliding type transfer cask includes a transfer container having a space for accommodating a canister; a neutron shielding body disposed around an outer circumference; and an opening/closing portion coupled to a lower portion of the transfer container. The opening/closing portion includes a support portion that has a first through-hole communicating with the transfer container and supports the transfer container; a base plate that is arranged below the support portion; and a lid assembly that includes a first lid portion and a second lid portion. The first lid portion includes a first lid and a first motor for sliding the first lid. The second lid portion includes a second lid and a second motor for sliding the second lid.

6 Claims, 7 Drawing Sheets

SPENT NUCLEAR FUEL TRANSFER CASK HAVING MOTOR-DRIVEN LIDS THAT SLIDE TOWARD AND AWAY FROM EACH OTHER

CROSS-REFERENCE TO RELATED APPLICATION

This application claims the benefit of Korean Patent Application No. 10-2019-0121738, filed on Oct. 1, 2019, in the Korean Intellectual Property Office, the disclosure of which is incorporated herein in its entirety by reference.

BACKGROUND

1. Field

The present disclosure relates to a sliding type transfer cask for spent nuclear fuel which is easy to install and move, and particularly, to a sliding type transfer cask for spent nuclear fuel, the sliding type transfer cask having reduced weight and volume, being easy to install and move by coupling an opening/closing portion to a lower portion of a transfer container, and simplifying a transfer procedure of spent nuclear fuel.

2. Description of Related Art

Figure 1:
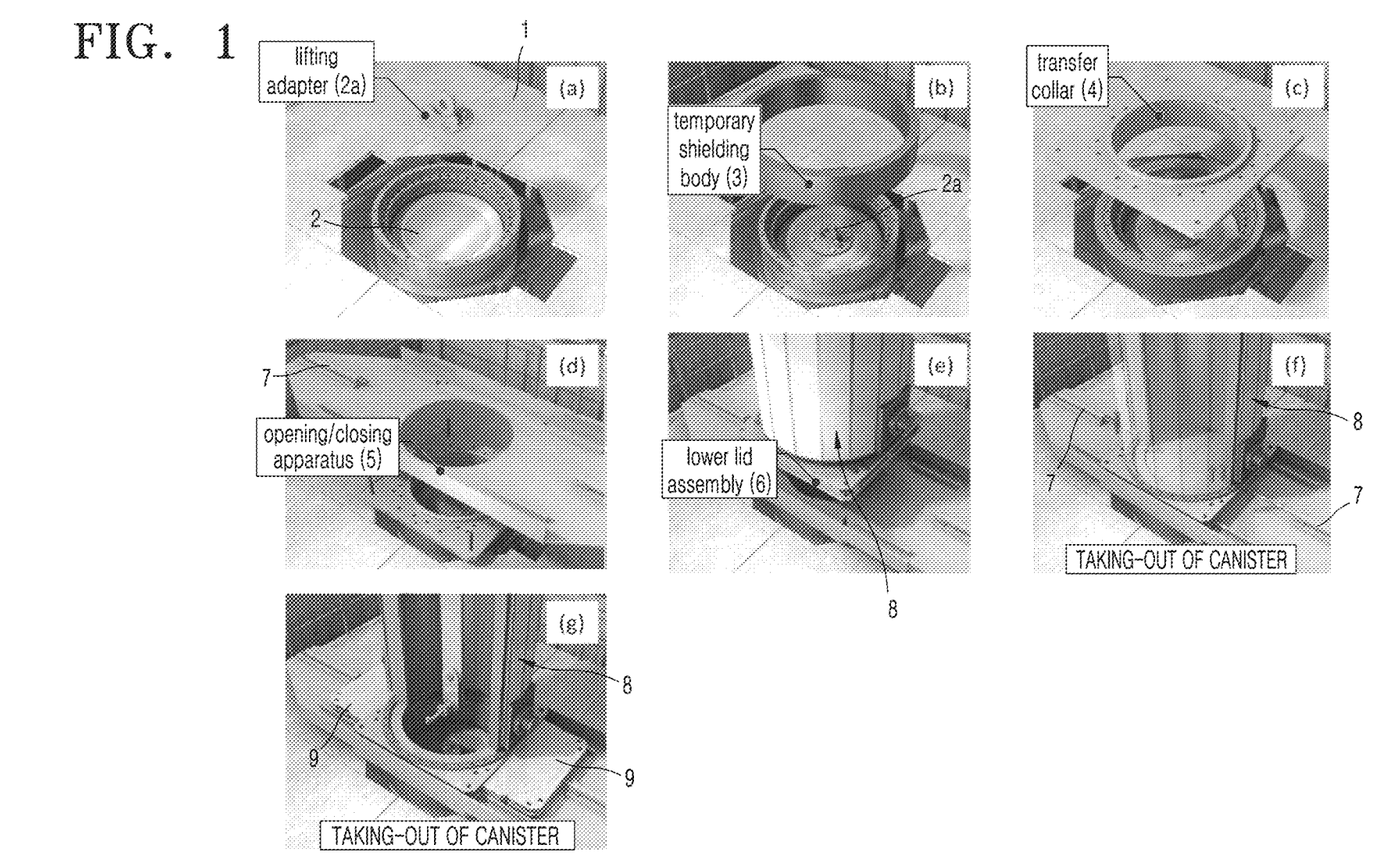
FIG. 1 is a view illustrating an installation process of a transfer cask of the related art.

FIG. 1 schematically illustrates a work procedure for moving spent nuclear fuel by using a transfer cask. FIG. 1A illustrates an initial situation before the spent nuclear fuel is transferred. A canister 2 in which the spent nuclear fuel is stored is located with an upper lid opened at a lower portion of a work table 1. The spent nuclear fuel remains sealed in the canister 2.

Subsequently, a temporary shielding body 3, a transfer collar 4, a lid opening/closing apparatus 5, and a lower lid assembly 6 are installed as illustrated in FIGS. 1B to 1E. An actuator 7 opens lower lids 9 of the lower lid assembly 6, which are formed of two square plates, by moving the lower lids 9 in opposite directions to each other.

Subsequently, a lifting apparatus connected to a crane is connected to a lifting adapter 2a installed on an upper portion of the canister 2 to take out the canister 2 into the transfer cask 8, and then, the actuator 7 operates to close the lower lids 9. Through a series of the processes, moving the canister 2 into the transfer cask 8 is completed. Subsequently, a process of moving the transfer cask 8 to a position of a storage cask used only for storing spent nuclear fuel is performed.

However, in the process of transferring the canister 2 as described above, the transfer collar 4, the lid opening/closing apparatus 5, the lower lids 9, and so on have to be designed and installed separately, and thus, the work requires too much time and a procedure becomes complicated. In addition, if much work time is spent because of a complicated procedure, a possibility that a worker is exposed to radiation increases.

SUMMARY

The present disclosure provides a sliding type transfer cask for spent nuclear fuel, the sliding type transfer cask having reduced weight and volume, being easy to install and move by coupling an opening/closing portion to a lower portion of a transfer container, and simplifying a transfer procedure of spent nuclear fuel.

Additional aspects will be set forth in part in the description which follows and, in part, will be apparent from the description, or may be learned by practice of the presented embodiments of the disclosure.

According to an embodiment of the present disclosure, a sliding type transfer cask for spent nuclear fuel that transfers a canister for storing the spent nuclear fuel, includes a transfer container having a space for accommodating the canister; a neutron shielding body disposed around an outer circumference of the transfer container to shield neutrons; and an opening/closing portion coupled to a lower portion of the transfer container to open and close the lower portion of the transfer container, wherein the opening/closing portion includes a support portion that has a first through-hole communicating with the transfer container and supports the transfer container, wherein a lower portion of the transfer container is placed on the support portion; a base plate that is arranged below the support portion at a certain interval and has a second through-hole through which the canister to be taken out passes; and a lid assembly that includes a first lid portion sliding between the support portion and the base plate to open and close part of the first through-hole, and a second lid portion sliding between the support portion and the base plate to open and close a remaining portion of the first through-hole, and wherein the first lid portion includes a first lid and a first motor for sliding the first lid, and the second lid portion includes a second lid and a second motor for sliding the second lid.

In addition, it is preferable that the transfer cask includes a first support frame coupled to the outside of the first lid and a second support frame coupled to the outside of the second lid.

In addition, it is preferable that the first and second motors are coupled to the support portion, and a first motor shaft of the first motor and a second motor shaft of the second motor protrude downward through the support portion, and the outside of the first support frame is engaged with the first motor shaft, and the outside of the second support frame is engaged with the second motor shaft, and when the first and second motors rotate, the first and second support frames slide to open and close the first through-hole.

In addition, it is preferable that a protrusion portion is formed at an end of the first lid, a placement portion on which the protrusion portion is placed is formed in the second lid, and the protrusion portion is placed on the placement portion of a step shape to close the first through-hole.

In addition, it is preferable that a guide rail for guiding the first and second support frames when the first and second support frames are slid is coupled to the base plate.

In addition, it is preferable that the first and second lids are formed in a semicircular shape, respectively, and the first support frame includes a pair of first side frames arranged to face each other in a sliding direction of the first lid and a first connection frame connecting the pair of first side frames to each other, and when the pair of first side frames and the first connection frame are arranged outside the first lid, an arc portion of the first lid, the pair of first side frames, and the first connection frame are spaced apart from each other to form an empty space, and the second support frame includes a pair of second side frames arranged to face each other in a sliding direction of the second lid and a second connection frame connecting the pair of second side frames to each other, and when the second side frame and the second connection frame are arranged outside the second lid, an arc portion of the second lid, the pair of second side frames, and the second connection frame are spaced apart from each other to form an empty space.

In addition, it is preferable that a lower side of the base plate is coupled to a fitting plate that includes an insertion portion protruding downward and is fitted to an upper side of the canister.

In addition, it is preferable that a first guide groove extending in one direction is formed in a lower surface of the first lid, a second guide groove extending in one direction is formed in a lower surface of the second lid, and the base plate includes a first stopper that is inserted into the first guide groove and caught on an end of the first guide groove when the first lid is opened, and a second stopper that is inserted into the second guide groove and is caught on an end of the second guide groove when the second lid is opened.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects of the present description. As used herein, the term "and/or" includes any and all combinations of one or more of the associated listed items. Expressions such as "at least one of," when preceding a list of elements, modify the entire list of elements and do not modify the individual elements of the list.

Hereinafter, preferred embodiments according to the present disclosure will be described in detail with reference to the accompanying drawings.

Figure 2:
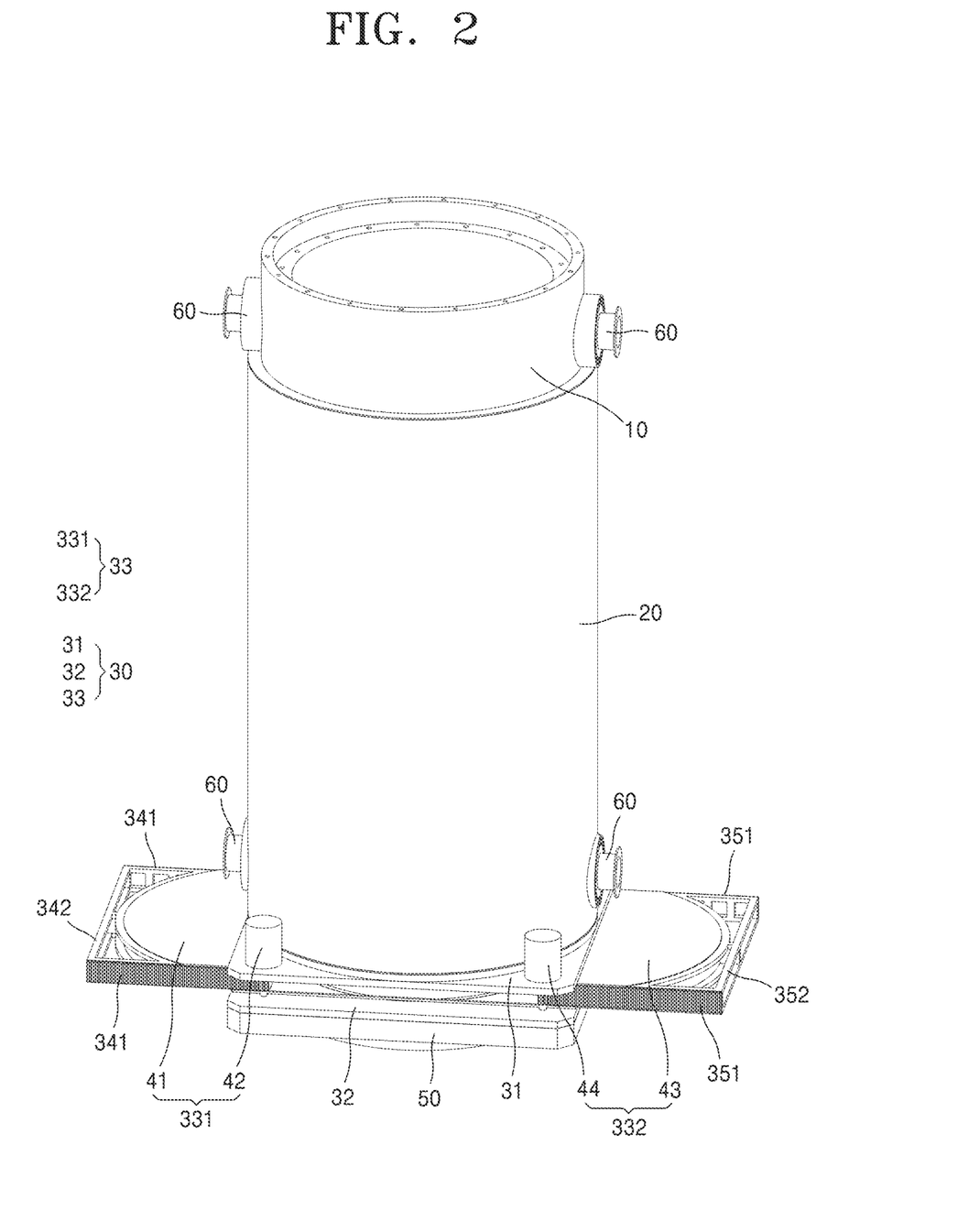
FIG. 2 is a perspective view of a transfer cask for spent nuclear fuel according to an embodiment of the present disclosure.
Figure 3:
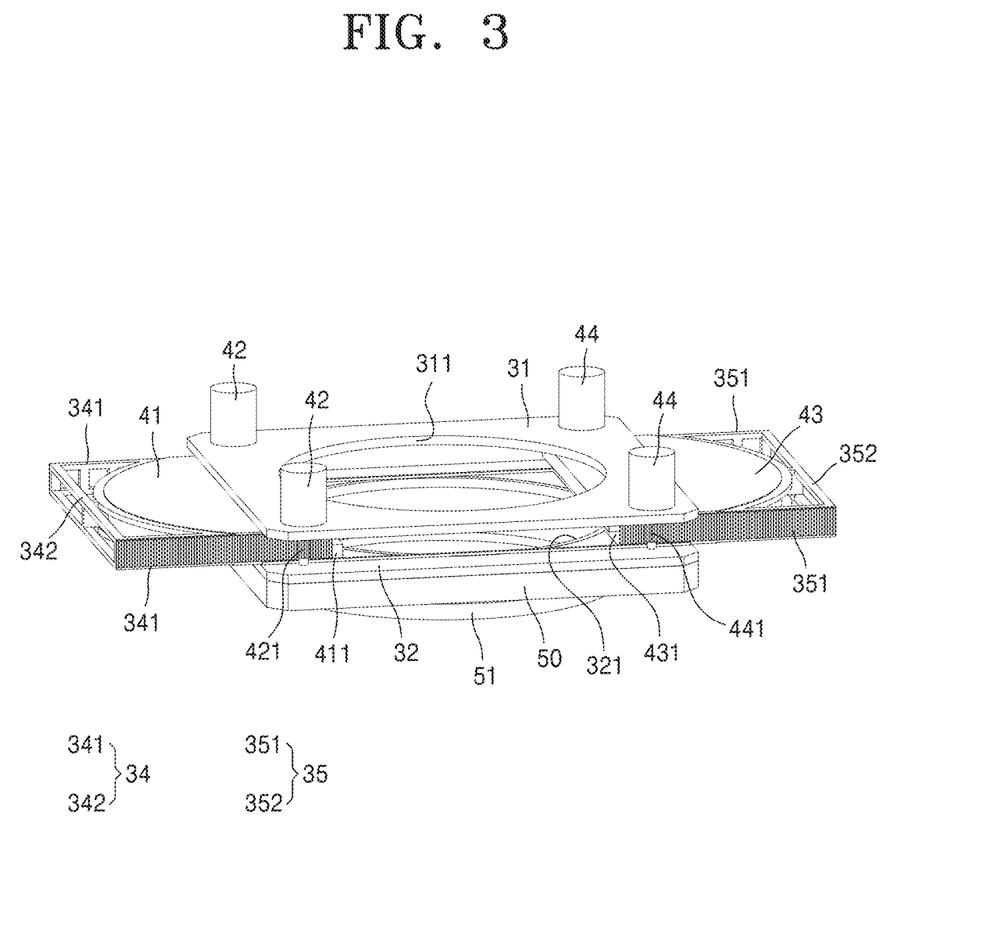
FIG. 3 is a perspective view of a main portion of FIG. 2.
Figure 4:
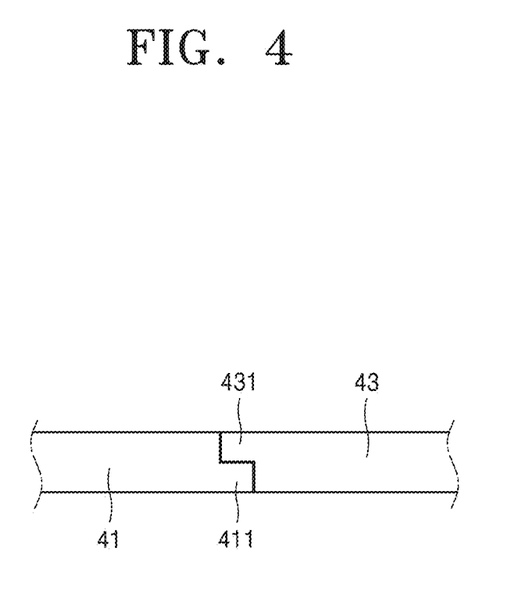
FIG. 4 is a cross-sectional view of first and second lids in a closed state.
Figure 5:
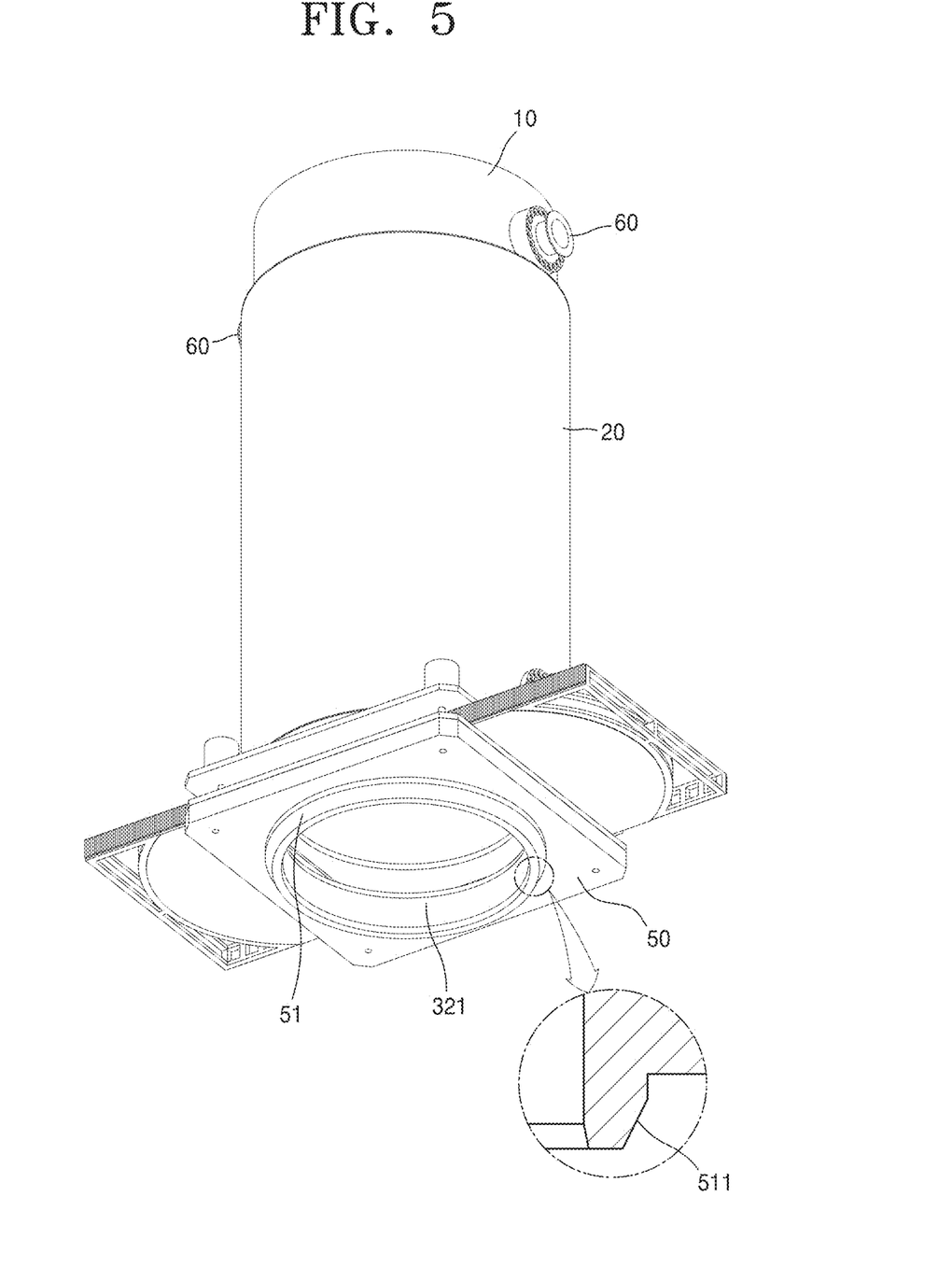
FIG. 5 is a bottom perspective view of FIG. 2.
Figure 6:
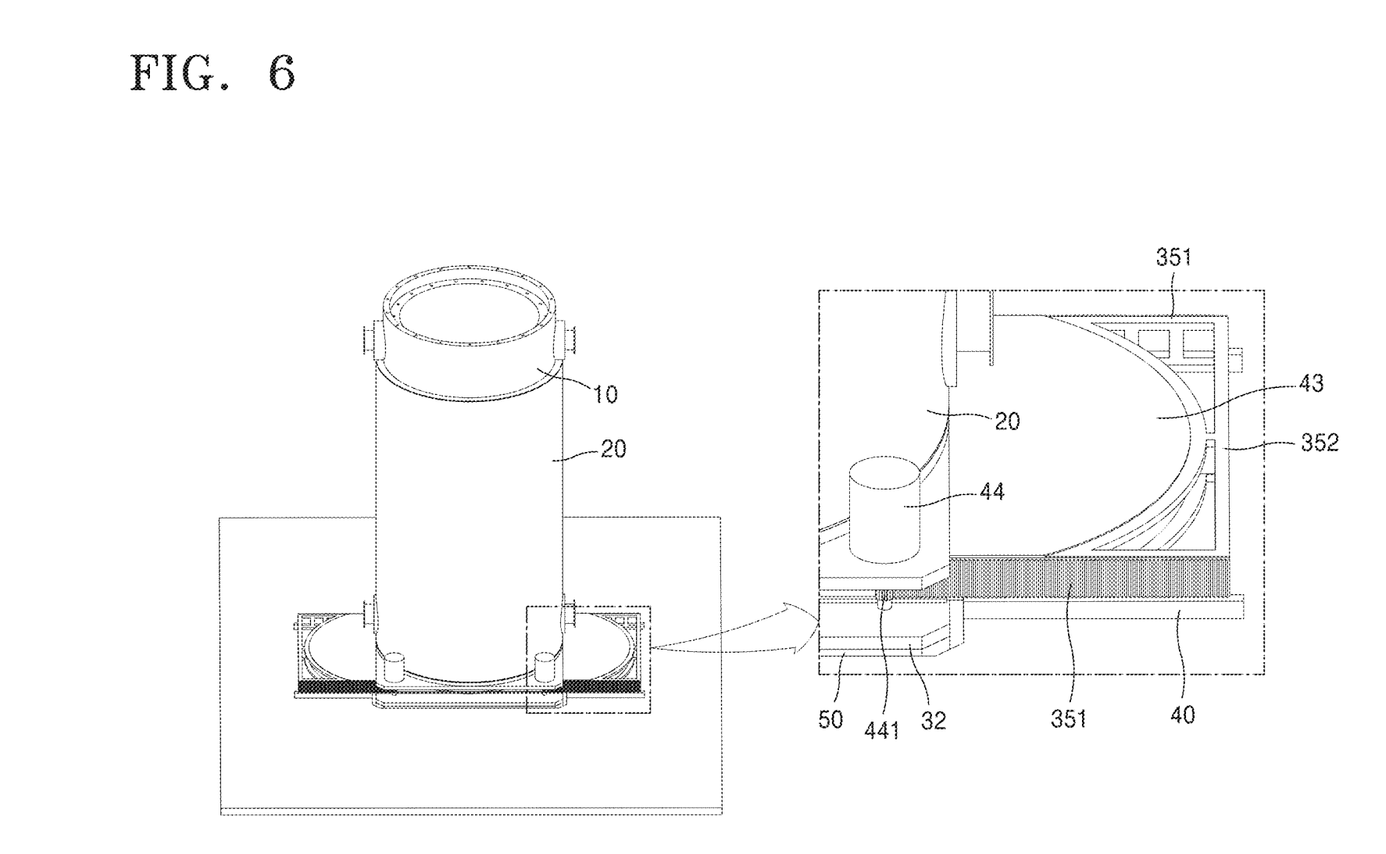
FIG. 6 is an enlarged view of a main portion of FIG. 3.
Figure 7:
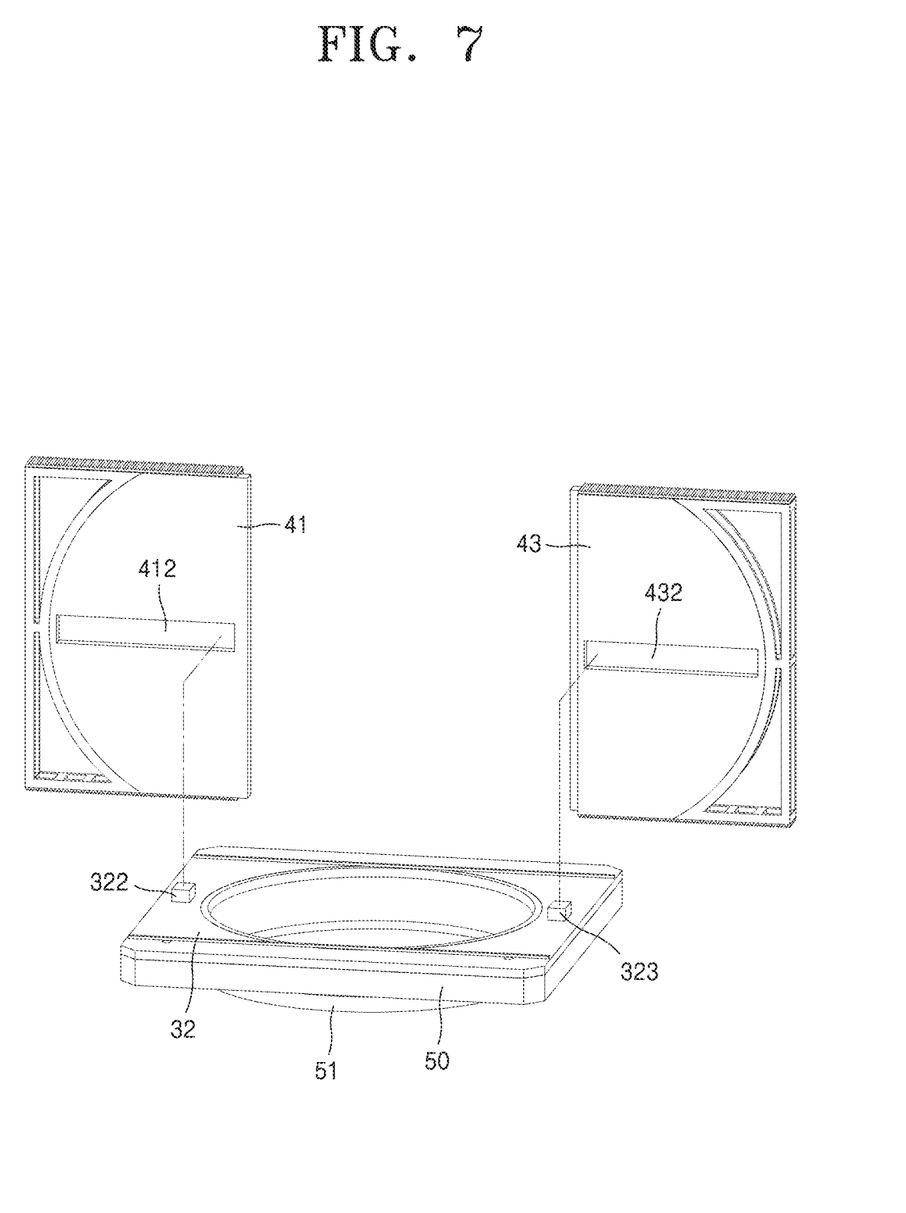
FIG. 7 is a view illustrating first and second stoppers and first and second guide grooves.

FIG. 2 is a perspective view of a transfer cask for spent nuclear fuel according to an embodiment of the present disclosure, and FIG. 3 is a perspective view of a main portion of FIG. 2; FIG. 4 is a cross-sectional view of first and second lids in a closed state, and FIG. 5 is a bottom perspective view of FIG. 2. FIG. 6 is an enlarged view of a main portion of FIG. 3, and FIG. 7 is a view illustrating first and second stoppers and first and second guide grooves.

The present disclosure relates to a transfer cask used for transferring a canister for storing spent nuclear fuel. A sliding type transfer cask for spent nuclear fuel that is easy to install and move according to an embodiment of the present disclosure includes a transfer container 10, a neutron shielding body 20, and an opening/closing portion 30.

As illustrated in FIG. 2, the transfer container 10 has a space for accommodating the canister. According to the present embodiment, the transfer container 10 are formed in a shape of a cylinder and upper and lower portions of the transfer container 10 are in an open state. According to the present embodiment, the transfer container 10 is made of a steel material.

The opening/closing portion 30 to be described below may be coupled to the lower portion of the transfer container 10, and an upper lid (not illustrated) may be coupled to the upper portion of the transfer container 10. Two trunnions 60 are coupled to each of upper and lower sides of the transfer container 10. The trunnions 60 are provided to be coupled to a lifting apparatus. The lower trunnion 60 is required for horizontal lifting and may be omitted when the horizontal lifting is not required in a work process.

The neutron shielding body 20 is provided to prevent neutrons emitted from spent nuclear fuel stored in the canister from being emitted to the outside. According to the present embodiment, the neutron shielding body 20 is arranged around an outer periphery of the transfer container 10 to shield neutrons.

The neutron shielding body 20 may be configured such that a water jacket containing water wraps the transfer container 10 or may be implemented in a form in which a separate outer wall is prepared to be spaced apart from an outer peripheral surface of the transfer container 10 at a certain interval to form an inner space therebetween and an epoxy resin (NS-4-FR) is included in the inner space. Of course, the neutron shielding body 20 is not limited to the shape described above.

The opening/closing portion 30 is coupled to the lower portion of the transfer container 10 and opens and closes the lower portion of the transfer container 10. According to the present embodiment, the opening/closing portion 30 includes a support portion 31, a base plate 32, and a lid assembly 33.

The support portion 31 supports the transfer container 10. The lower portion of the transfer container 10 is placed on the support portion 31, and a first through-hole 311 communicating with the transfer container 10 is formed in the support portion 31. According to the present embodiment, the support portion 31 is coupled to the transfer container 10 by using a method such as bolting or welding. The support portion 31 may be moved to an installation space together with the transfer container 10.

The base plate 32 is arranged below the support portion 31 to be spaced apart from the support portion 31 at a certain interval. A second through-hole 321 through which the canister to be taken out passes is formed in the base plate 32. A size of the second through-hole 321 is substantially the same as a size of the first through-hole 311.

The base plate 32 is formed to have a size corresponding to the support portion 31. According to the present embodiment, the support portion 31 is formed in a square shape, and the base plate 32 is also formed in a square shape. Of course, the shapes of the support portion 31 and the base plate 32 are not limited thereto. An interval formed between the base plate 32 and the support portion 31 is provided as a space in which the lid assembly 33, which will be described below, may be moved.

Referring to FIG. 3, the lid assembly 33 is provided to open and close the lower portion of the transfer container 10 and includes a first lid portion 331 and a second lid portion 332.

The first lid portion 331 opens and closes part of the first through-hole 311. According to the present embodiment, the first lid portion 331 is provided to be slidable between the support portion 31 and the base plate 32.

According to the present embodiment, the first lid portion 331 includes a first lid 41 and first motors 42.

The first lid 41 has a semicircular shape. The first lid 41 approaches the center of the first through-hole 311 or slides while moving back from the center of the first through-hole 311 in a radial direction. A protrusion portion 411 is formed to protrude from an end of the first lid 41. When the first lid 41 is completely slid toward the center of the first through-hole 311, the protrusion portion 411 is located outside a diameter of the first through-hole 311.

The first motors 42 are provided to slide the first lid 41. According to the present embodiment, the first motors 42 are coupled to the support portion 31. Specifically, bodies of the first motors 42 are coupled to an upper surface of the support portion 31, and first motor shafts 421 of the first motors 42 pass through the support portion 31 to protrude downward. As illustrated in FIG. 3, according to the present embodiment, the first motors 42 are respectively installed at both corners of one side of the support portion 31.

According to the present embodiment, the second lid portion 332 includes a second lid 43 and second motors 44.

The second lid 43 is formed in a semicircular shape and forms a circular plate together with the first lid 41. The second lid 43 approaches the center of the first through-hole 311 or slides while moving back from the center of the first through-hole 311 in a radial direction, like the first lid 41. The second lid 43 and the first lid 41 slide in a direction close to or spaced apart from each other.

A placement portion 431 on which the protrusion portion 411 is placed is formed on the second lid 43. The placement portion 431 is formed to face the protrusion portion 411. As illustrated in FIG. 4, when the first and second lids 41 and 43 slide in a direction close to each other to cover the first through-hole 311, the protrusion portion 411 is placed on the placement portion 431 having a step shape to close the first through-hole 311.

The second motors 44 are provided to slide the second lid 43. According to the present embodiment, the second motors 44 are coupled to the support portion 31. Specifically, bodies of the second motors 44 are coupled to the upper surface of the support portion 31, and second motor shafts 441 of the second motors 44 pass through the support portion 31 to protrude downward. As illustrated in FIG. 3, according to the present embodiment, the second motors 44 are respectively installed at both corners of another side facing the one side of the support portion 31 on which the first motors 42 are installed.

An embodiment of the present disclosure includes a first support frame 34 and a second support frame 35.

The first support frame 34 is coupled to the outside of the first lid 41 and stably slide the first lid 41 while supporting the first lid 41. The first support frame 34 includes first side frames 341 and a first connection frame 342.

The first side frames 341 are arranged to face each other in a direction in which the first lid 41 slides. A pair of the first side frames 341 face each other in contact with the first lid 41.

The first connection frame 342 connects the pair of first side frames 341 to each other. Accordingly, the pair of first side frames 341 and the first connection frame 342 are coupled in a "⊏" shape, and the first lid 41 is coupled thereto in an inner space thereof.

According to the present embodiment, when the pair of first side frames 341 and the first connection frame 342 are arranged outside the first lid 41, an arc portion of the first lid 41, the pair of first side frames 341, and the first connection frame 342 are spaced apart from each other to form an empty space. A weight is reduced due to the empty space, and thus, the pair of first side frames 341 and the first connection frame 342 may slide smoothly together with the first lid 41.

As illustrated in FIG. 3, the outside of the first support frames 34 is engaged with the first motor shafts 421. Specifically, racks are formed on outer surfaces of the first side frames 341 of the first support frame 34, the first motor shafts 421 are coupled to the racks in a serrated manner, and when the first motors 42 rotate, the first support frame 34 slides to open and close the first through-hole 311.

The second support frame 35 is coupled to the outside of the second lid 43 and stably slides the second lid 43 while supporting the second lid 43. The second support frame 35 includes second side frames 351 and a second connection frame 352.

The second side frames 351 are arranged to face each other in a direction in which the second lid 43 slides. A pair of the second side frames 351 face each other in contact with the second lid 43.

The second connection frame 352 connects the pair of second side frames 351 to each other. A structure in which the second lid 43 is coupled to the pair of second side frames 351 and the second connection frame 352 is the same as a structure in which the first lid 41 is coupled to the pair of first side frames 341 and the first connection frame 342, that is, the pair of second side frames 351 and the second connection frame 352 are coupled to each other in a "⊏" shape and the second lid 43 is coupled thereto in an inner space thereof.

According to the present embodiment, when the pair of second side frames 351 and the second connection frame 352 are arranged outside the second lid 43, an arc portion of the second lid 43, the pair of second side frames 351, and the second connection frame 352 are spaced apart from each other to form an empty space. A weight is reduced due to the empty space, and thus, the pair of second side frames 351 and the second connection frame 352 may slide smoothly together with the second lid 43.

As illustrated in FIG. 3, the outside of the second support frame 35 is engaged with the second motor shafts 441. Specifically, racks are formed on outer surfaces of the second side frames 351 of the second support frame 35, the second motor shafts 441 are coupled to the racks in a serrated manner, and when the second motors 44 rotate, the second support frame 35 slides to open and close the first through-hole 311.

An embodiment of the present disclosure may further include a guide rail 40 and a fitting plate 50.

The guide rail 40 is provided on the base plate 32 to guide the first and second support frames 34 and 35 when the first and second support frames 34 and 35 slide.

As illustrated in FIG. 6, according to the present embodiment, the guide rail 40 is provided under the pair of first and second side frames 341 and 351 and protrudes from the base plate 32 to the outside, and thus, when the first and second support frames 34 and 35 move back to open the first through-hole 311, the first and second support frames 34 and 35 may be prevented from falling down due to gravity.

As illustrated in FIG. 5, the fitting plate 50 is provided under the base plate 32, and the fitting plate 50 has an insertion portion 51 that protrudes downward to be fitted to an upper side of the canister. An inclined surface 511 is provided on an outer surface of the insertion portion 51.

When the transfer cask according to the present disclosure is installed in a transport cask in which the canister is temporarily accommodated, the insertion portion 51 may be easily inserted into an upper side of the transport cask due to the inclined surface 511, and the insertion portion 51 is formed to have a certain height, and thus, the insertion portion 51 serves as a transfer collar required when a transfer cask of the related art is installed.

An embodiment of the present disclosure may further include first and second stoppers 322 and 323 and first and second guide grooves 412 and 432.

The first stopper 322 is formed to protrude upward from one side of the base plate 32. The second stopper 323 is formed to protrude upward from the other side of the base plate 32.

The first guide groove 412 is formed so that the first stopper 322 may be inserted thereinto. According to an embodiment of the present disclosure, the first guide groove 412 is formed to extend in one direction on a lower surface of the first lid 41. When the first lid 41 is opened and closed, the first stopper 322 is moved in a state inserted into the first guide groove 412, and when the first lid 41 is completely opened, the first stopper 322 is caught on an end of the first guide groove 412 to regulate movement of the first lid 41.

The second guide groove 432 is provided so that the second stopper 323 may be inserted thereinto. According to an embodiment of the present disclosure, the second guide groove 432 is formed to extend in one direction on a lower surface of the second lid 43. When the second lid 43 is opened and closed, the second stopper 323 is moved in a state inserted into the second guide groove 432, and when the second lid 43 is completely opened, the second stopper 323 is caught on an end of the second guide groove 432 to regulate movement of the second lid 43.

Of course, according to an embodiment of the present disclosure, the first and second stoppers 322 and 323 are formed on the base plate 32, and the first and second guide grooves 412 and 432 are respectively formed in the first and second lids 41 and 43, and the stoppers and the guide grooves may change in position. For example, the first and second stoppers 322 and 323 may be respectively formed in the first and second support frames 34 and 35, and the first and second guide grooves 412 and 432 may be formed in the guide rail 40.

Hereinafter, an operation and an effect of a sliding type transfer cask for spent nuclear fuel which is easy to install and move according to the above-described configuration will be described in detail.

According to an embodiment of the present disclosure, a transfer collar, a lid opening/closing apparatus, and a lower lid of the related art (see FIG. 1) are integrated with the above-described opening/closing portion 30 and coupled to the lower portion of the transfer container 10. The transfer cask according to the present disclosure is moved to an upper side of the canister by using a lifting apparatus, and the opening/closing portion 30 is inserted into the transport cask. In this case, the insertion portion 51 of the fitting plate 50 coupled to a lower side of the base plate 32 is inserted into an upper portion of the transport cask.

Subsequently, when the first and second motors 42 and 44 operate, the first and second support frames 34 and 35, which are gear-coupled with the first and second motor shafts 421 and 441, move back and the first and second lids 41 and 43 open. The canister is pulled up into the transfer container 10 by connecting the lifting apparatus to a lifting adapter 2a provided in the canister. When the canister is accommodated inside the transfer container 10, the first and second motors 42 and 44 are reversely rotated again to slide the first and second support frames 34 and 35 toward the center of the first through-hole 311 and close the first and second lids 51 and 53. After an upper lid (not illustrated) of the transfer container 10 is covered to close an upper portion, the transfer cask is moved to a desirable storage place.

As such, the sliding type of transfer cask for spent nuclear fuel, which is easy to install and move according to the present disclosure, may transfer the transfer container 10 in a state in which the opening/closing portion 30 is coupled to a lower portion of the transfer container 10, and thus, there is an effect of simplifying transfer of the canister.

In addition, when a cylinder is used to open and close a lid of the related art, a length of a body and a rod of the cylinder have to be considered, and thus, there is a problem that a size of an installation plate on which the cylinder is installed is increased to cause a significant increase in weight and volume, and according to an embodiment of the present disclosure, the first and second motors 42 and 44 for sliding the first and second lids 41 and 43 are installed on the support portion 41, and thus, there is no need to add a separate installation plate to install the first and second motors 42 and 44, and when the first and second lids 41 and 43 move back, the first and second support frames 34 and 35 slide along the guide rail 40, and thus, the weight and volume are significantly reduced to provide an effect in which transfer is convenient.

In addition, by reducing weight and volume of a transfer cask, the transfer container 10 coupled to the opening/closing portion 30 may be moved to a lifting apparatus at one time, thus, there is an effect that a work time is reduced when moving a canister and the amount of radiation exposure of an operator is reduced.

A sliding type transfer cask for spent nuclear fuel which is easy to install and move, according to an embodiment of the present disclosure, provides an effect of simplifying installation and movement by reducing weight and volume and of simplifying a transfer procedure for spent nuclear fuel.

In addition, an opening/closing portion that opens and closes a lower portion of a transfer container is integrally manufactured with the transfer container to simplify a work procedure at the time of moving a canister, and thus, it is possible to obtain an effect of reducing an operation time and reducing the amount of exposure of an operator.

It should be understood that embodiments described herein should be considered in a descriptive sense only and not for purposes of limitation. Descriptions of features or aspects within each embodiment should typically be considered as available for other similar features or aspects in other embodiments. While one or more embodiments have been described with reference to the figures, it will be understood by those of ordinary skill in the art that various changes in form and details may be made therein without departing from the spirit and scope of the disclosure as defined by the following claims.

What is claimed is:

1. Spent nuclear fuel transfer cask having motor-driven lids that slide toward and away from each other, the spent nuclear fuel transfer cask comprising:
   a transfer container having a space for accommodating a canister storing spent nuclear fuel;
   a neutron shielding body disposed around an outer circumference of the transfer container to shield neutrons; and an opening/closing portion coupled to a lower portion of the transfer container to open and close the lower portion of the transfer container, wherein the opening/closing portion comprises a support portion that has a first through-hole communicating with the transfer container and supports the transfer container, wherein a lower portion of the transfer container is placed on the support portion;

a base plate that is arranged below the support portion at a certain interval and has a second through-hole through which the canister to be taken out passes; and a lid assembly that includes a first lid portion sliding between the support portion and the base plate to open and close part of the first through-hole, and a second lid portion sliding between the support portion and the base plate to open and close a remaining portion of the first through-hole, and wherein the first lid portion includes a first lid and a first motor for sliding the first lid, and the second lid portion includes a second lid and a second motor for sliding the second lid, the spent nuclear fuel transfer cask further comprising, a first support frame coupled to the outside of the first lid; and a second support frame coupled to the outside of the second lid, wherein the first and second motors are coupled to the support portion, a first motor shaft of the first motor and a second motor shaft of the second motor protrude downward through the support portion, the outside of the first support frame is engaged with the first motor shaft, the outside of the second support frame is engaged with the second motor shaft, and when the first and second motors rotate, the first and second support frames slide to open and close the first through-hole.

2. The spent nuclear fuel transfer cask of claim 1, wherein a protrusion portion is formed at an end of the first lid, a placement portion on which the protrusion portion is placed is formed in the second lid, and the protrusion portion is placed on the placement portion of a step shape to close the first through-hole.

3. The spent nuclear fuel transfer cask of claim 1, wherein a guide rail for guiding the first and second support frames when the first and second support frames are slid is coupled to the base plate.

4. The spent nuclear fuel transfer cask of claim 1, wherein the first and second lids are formed in a semicircular shape, respectively, the first support frame includes a pair of first side frames arranged to face each other in a sliding direction of the first lid and a first connection frame connecting the pair of first side frames to each other, and when the pair of first side frames and the first connection frame are arranged outside the first lid, an arc portion of the first lid, the pair of first side frames, and the first connection frame are spaced apart from each other to form an empty space, and the second support frame includes a pair of second side frames arranged to face each other in a sliding direction of the second lid and a second connection frame connecting the pair of second side frames to each other, and when the second side frame and the second connection frame are arranged outside the second lid, an arc portion of the second lid, the pair of second side frames, and the second connection frame are spaced apart from each other to form an empty space.

5. Spent nuclear fuel transfer cask having motor-driven lids that slide toward and away from each other, the spent nuclear fuel transfer cask comprising:

a transfer container having a space for accommodating a canister storing spent nuclear fuel;

a neutron shielding body disposed around an outer circumference of the transfer container to shield neutrons; and an opening/closing portion coupled to a lower portion of the transfer container to open and close the lower portion of the transfer container, wherein the opening/closing portion comprises a support portion that has a first through-hole communicating with the transfer container and supports the transfer container, wherein a lower portion of the transfer container is placed on the support portion;

a base plate that is arranged below the support portion at a certain interval and has a second through-hole through which the canister to be taken out passes; and a lid assembly that includes a first lid portion sliding between the support portion and the base plate to open and close part of the first through-hole, and a second lid portion sliding between the support portion and the base plate to open and close a remaining portion of the first through-hole, and wherein the first lid portion includes a first lid and a first motor for sliding the first lid, and the second lid portion includes a second lid and a second motor for sliding the second lid, wherein a lower side of the base plate is coupled to a fitting plate that includes an insertion portion protruding downward and is inserted to an upper side of the canister.

6. Spent nuclear fuel transfer cask having motor-driven lids that slide toward and away from each other, the spent nuclear fuel transfer cask comprising:

a transfer container having a space for accommodating a canister storing spent nuclear fuel;

a neutron shielding body disposed around an outer circumference of the transfer container to shield neutrons; and an opening/closing portion coupled to a lower portion of the transfer container to open and close the lower portion of the transfer container, wherein the opening/closing portion comprises a support portion that has a first through-hole communicating with the transfer container and supports the transfer container, wherein a lower portion of the transfer container is placed on the support portion;

a base plate that is arranged below the support portion at a certain interval and has a second through-hole through which the canister to be taken out passes; and a lid assembly that includes a first lid portion sliding between the support portion and the base plate to open and close part of the first through-hole, and a second lid portion sliding between the support portion and the base plate to open and close a remaining portion of the first through-hole, and wherein the first lid portion includes a first lid and a first motor for sliding the first lid, and the second lid portion includes a second lid and a second motor for sliding the second lid, wherein a first guide groove extending in one direction is formed in a lower surface of the first lid, a second guide groove extending in one direction is formed in a lower surface of the second lid, and the base plate includes a first stopper that is inserted into the first guide groove and is caught on an end of the first guide groove when the first lid is opened, and a second stopper that is inserted into the second guide groove and is caught on an end of the second guide groove when the second lid is opened.

* * * * *